Patented Apr. 29, 1941

2,240,116

UNITED STATES PATENT OFFICE 2,240,116

METHOD OF PURIFYING GELATIN

Eric Leighton Holmes, London, England, assignor, by mesne assignments, to The Permutit Company, New York, N. Y., a corporation of Delaware No Drawing. Application July 26, 1940, Serial No. 347,640
In Great Britain April 6, 1939

3 Claims. (Cl. 260—118)

This invention relates to a method of purifying gelatin; and it comprises contacting a gelatin solution with ion exchange material, all as more fully described hereinafter and as claimed.

Gelatin is extracted from animal matter, usually pretreated with lime, by means of hot water or steam. The resulting gelatin solution is always more or less contaminated by salts, mainly calcium phosphate, derived from the animal matter from which the gelatin has been extracted. Additional impurities in the gelatin solution are due to chlorides, sulfates or the like, present in the water used for washing the animal matter prior to extraction and in the water used for the extraction itself. In attempts to obtain pure gelatin, the solution, prior to drying, has been subjected to both chemical and mechanical treatments. The chemical methods used in the past include a treatment of the solution with alum, phosphoric acid or sulfurous acid followed by milk of lime or albumen to produce a floc carrying down with it the impurities to be removed. The mechanical treatment comprises filtering or centrifuging. With these methods, however, it has been difficult to produce a gelatin of the extreme purity required for certain purposes, such as photography.

It is the object of my invention to provide a method of purifying gelatin to an extremely high degree, and especially to reduce the ash content of the gelatin to a negligible quantity.

This object is achieved by subjecting the gelatin solution, prior to drying, to ion exchange treatment. The solution is contacted with a cation exchange material such as sulfonated coal, charged with hydrogen ions, whereby any chloride, sulfate, phosphate and carbonate salts present in the solution are transformed into hydrochloric, sulfuric, phosphoric and carbonic acids, respectively. The resulting acid gelatin solution is then contacted with an acid removing anion exchange material charged with hydroxyl ions, such as aniline black compound or other carbonaceous anion exchange material, iron oxide gel, or synthetic resin adapted to remove acid from solution. In this manner a gelatin solution practically free of both saline matters and mineral acids is obtained.

The best way of carrying out this method of purification is to place beds of ion exchange materials in granular form into separate containers provided with the necessary valves and connections, and to pass the solution to be purified successively through the containers.

The strength of solution undergoing the purification treatment is preferably of the order of five to ten per cent, although stronger or weaker solutions may be used. However, if the solution is considerably weaker the cost of the subsequent drying operation is increased, and the dried gelatin contains somewhat larger amounts of impurities resulting from the larger quantity of water evaporated in drying. If the concentration is appreciably greater than ten per cent, on the other hand, the viscosity is so high that the solution tends to adhere to the ion exchange material instead of passing through it.

The purification is best carried out within a temperature range of 90 to 120° F. Higher temperatures not only tend to result in some disintegration of the gelatin but also cause a perceptible shortening of the life of the ion exchange materials, whereas at much lower temperatures than 90° F. the solution has an increased viscosity which tends to make it adhere to the ion exchange materials, as stated above.

It is the nature of the ion exchange materials used in this method of gelatin purification to become exhausted after a certain extent of use, and they must then be recharged with the kind of ion serving their particular purpose. To this end, the cation exchange material is regenerated with dilute acid, such as sulfuric or hydrochloric acid, and the acid removal material is regenerated with the dilute solution of an alkali, such as caustic soda, soda ash, sodium bicarbonate, ammonium hydroxide, or the like. After regeneration, the ion exchange materials must be freed, by rinsing with water, of excess regenerant and of the products resulting from the regenerating reactions. Before re-using the ion exchange materials subsequent to rinsing it is advantageous to drain all rinse water from the tanks containing the ion exchange materials in order to avoid excessive dilution of the first portion of gelatin solution undergoing the treatment.

Prior to regeneration, all gelatin solution is preferably drained from the tanks and collected for use in order to avoid its loss in the course of regeneration.

In some uses for gelatin almost complete freedom of ash is required while the presence of small amounts of mineral acids may be permitted. In such cases the gelatin solution may be purified merely by contact with cation exchange material charged with hydrogen ions, the second step of contacting the solution with acid removal material being dispensed with.

What I claim is:

1. A method of purifying gelatin solution which comprises passing the gelatin solution in a concentration of the order of five to ten per cent and at a temperature of 90 to 120° F. through insoluble granular cation exchange material containing hydrogen as exchangeable ions.

2. A method of purifying gelatin solution which comprises passing the gelatin solution successively through a bed of insoluble cation exchange material and a bed of acid removing anion exchange material, draining all gelatin solution from said beds, and regenerating said beds by treatment with dilute acid and alkali solutions, respectively.

3. A method of purifying gelatin solution which comprises passing the gelatin solution successively through a bed of insoluble cation exchange material and a bed of acid removing anion exchange material, draining all gelatin solution from said beds, regenerating said beds by treatment with dilute acid and alkali solutions, respectively, passing rinse water through said beds until said beds are freed of excess regenerant and products resulting from regenerating reactions, draining said beds free of all rinse water, and again passing gelatin solution successively through said beds.

ERIC LEIGHTON HOLMES.